United States Patent
Hirzel et al.

(10) Patent No.: US 10,679,000 B2
(45) Date of Patent: Jun. 9, 2020

(54) INTERPRETING CONVERSATIONAL AUTHORING OF INFORMATION MODELS

(71) Applicant: International Business Machines Corporation, Armonk, NY (US)

(72) Inventors: Martin Hirzel, Ossining, NY (US); Avraham Ever Shinnar, Hawthorne, NY (US); Jerome Simeon, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 15/865,317

(22) Filed: Jan. 9, 2018

(65) Prior Publication Data

US 2019/0213244 A1    Jul. 11, 2019

(51) Int. Cl.
*G06F 16/00* (2019.01)
*G06F 40/20* (2020.01)
(Continued)

(52) U.S. Cl.
CPC ............ *G06F 40/20* (2020.01); *G06F 16/212* (2019.01); *G06F 40/295* (2020.01); *G06F 40/30* (2020.01); *G06F 40/35* (2020.01); *G06F 40/56* (2020.01); *G10L 15/18* (2013.01); *G10L 15/22* (2013.01); *G10L 15/26* (2013.01); *G06F 8/10* (2013.01)

(58) Field of Classification Search
CPC .............................. G06F 16/33; G06F 16/3329
See application file for complete search history.

(56) References Cited

U.S. PATENT DOCUMENTS 5,197,005 A    3/1993    Shwartz et al.
5,495,604 A    2/1996    Harding et al.
(Continued)

OTHER PUBLICATIONS

Alan W. Brown, et al., "A Rational approach to model-driven development," IBM Systems Journal 45, No. 3 (2006):463-480. Retrieved from Internet using: https://www.researchgate.net/profile/Alan_Brown12/publication/224101617_A_Rational_approach_to_model-driven_development/links/0a85e53450762dbb4e000000.pdf.

(Continued)

*Primary Examiner* — Daniel Abebe
(74) *Attorney, Agent, or Firm* — Cantor Colburn LLP; Anthony Curro (57) ABSTRACT

A method and a system for interpreting conversational authoring of information models. The system includes an understanding module, a managing module, and a generating module. The understanding module is configured to understand a natural language input to interpret an output. The managing module is configured to construct an information model based on the output of the understanding module. The generating module configured is to prompt, as a response to the natural language inputs, wherein the natural language inputs determine concepts and relationships of the concepts. The method includes receiving an interactive dialog between a conversational agent and an information model designer in natural language to produce an information model. The method can further include validating the information model using an information model management system. The method can include interpreting the information model with the use of an application.

19 Claims, 9 Drawing Sheets

(51) Int. Cl.
*G10L 15/22* (2006.01)
*G10L 15/26* (2006.01)
*G10L 15/18* (2013.01)
*G06F 16/21* (2019.01)
*G06F 40/30* (2020.01)
*G06F 40/35* (2020.01)
*G06F 40/56* (2020.01)
*G06F 40/295* (2020.01)
*G06F 8/10* (2018.01)

(56) References Cited

U.S. PATENT DOCUMENTS

| | | | |
|---|---|---|---|
| 7,310,642 B2 | 12/2007 | McConnell et al. | |
| 9,418,183 B2 | 8/2016 | Mahate et al. | |
| 2006/0085414 A1* | 4/2006 | Chai | G06F 16/36 |
| 2012/0233128 A1* | 9/2012 | Solmer | G06K 9/00442 |
| | | | 707/661 |
| 2017/0163584 A1* | 6/2017 | Meng | H04L 51/18 |

OTHER PUBLICATIONS

B. Selic "The pragmatics of model-driven development," IEEE Software, Year: 2003, vol. 20, Issue: 5, pp. 19-25.

D. Leroux, et al., "Rational Software Architect: A tool for domain-specific modeling", IBM Systems Journal 45 No. 3, 2006.

Ion Androutsopoulos, et al., "Natural language interfaces to databases—an introduction," Natural language engineering 1, No. 1 (1995): 29-81. Retrieved from Internet using: https://arxiv.org/pdf/cmp-lg/9503016.

M. F. Van Bommel et al., "Interactive object-oriented schema development," Proceedings Seventh International Workshop on Computer-Aided Software Engineering, Year: 1995, pp. 391-399.

T.A. Halpin & J. Wijbenga, "FORML 2," Enterprise, Business-Process and Information Systems Modeling, eds. I. Bider et al., LNBIP 50, Springer-Verlag, Berlin Heidelberg (2010), pp. 247-260.

* cited by examiner

```
800
       C: Welcome to the database schema authoring dialog.
          Please specify some tables.
       H: Let's start with Products and Locations.
       C: Okay, let's take Products first. What are its
          attributes?
       H: Products have an item, a class and an inventory
          all containing strings, and a product id which is a
          number.
       C: Okay, is product id the key for that table?
       H: Yes.
       C: Okay, what are the Locations attributes?
       H: Locations are composed of a city and country.
       C: Are those names?
       H: Yes.
       C: ...
```

INTERPRETING CONVERSATIONAL AUTHORING OF INFORMATION MODELS

FIELD OF THE INVENTION

The present invention relates to a method and system for interpreting information models. More particularly, the present invention relates to interpreting conversational authoring of information models.

BACKGROUND

Many database and other technologies for storing or processing data depend upon information models. Usually, information models are manually authored or coded by expert database programmers. For instance, the information model for a database, also known as a database schema, is typically written by a trained professional database administrator or a database programmer. Besides databases, other technologies also use information models. For instance, software applications for business event processing use information models known as business object models which are also hand-authored by expert programmers.

Unfortunately, when only expert programmers can author information models, that can cause various problems. For example, experts at a particular data storage or processing technology such as a database are unlikely to know the domain of the data to be stored or processed such as for logistics for managing the inventory or shipping of physical products. As a result, either domain experts need more training or more project member positions are needed, which drive up business costs, delay the project schedule, and possibly introduce mistakes due to miscommunication.

SUMMARY

The following presents a summary to provide a basic understanding of one or more embodiments of the invention. The summary is not intended to identify key or critical elements, or delineate any scope of the particular embodiments or any scope of the claims. Its sole purpose is to present concepts in a simplified form as a prelude to the more detailed description that is presented later.

According to an embodiment, system includes an understanding module, a managing module, and a generating module. The understanding module is configured to understand a natural language input to interpret an output. The managing module is configured to construct an information model based on the output of the understanding module. The generating module configured is to prompt, as a response to the natural language inputs, wherein the natural language inputs determine concepts and relationships of the concepts.

According to another embodiment, a system includes a conversational agent that interacts with an information model designer in natural language to produce an information model. The system can further include an information model management system that interprets and validates the information model and an application that interprets the information model, wherein the information model includes concepts for information and relationships between the concepts.

According to another embodiment, a method includes receiving an interactive dialog between a conversational agent and an information model designer in natural language to produce an information model. The method can further include validating the information model using an information model management system. The method can further include interpreting the information model with the use of an application, wherein the information model includes concepts for information and relationships between the concepts.

BRIEF DESCRIPTION OF THE DRAWINGS

Embodiments will be described in more detail in conjunction with the accompanying drawings, in which.

DETAILED DESCRIPTION OF THE PREFERRED EMBODIMENTS

Embodiments of the present invention enables domain experts to author information models in software engineering without requiring them to be, or to rely upon, experts at the particular storage processing technology such as database programmers by adopting a conversational agent. More specifically, this invention offers a natural-language dialog between the domain expert and the system using a software conversational agent for authoring the information model. The conversational agent needs to be natural in order to require no prior training for the user and to have both a natural and precise dialog. This can be achieved using a robust natural language processor, confirmation and repair, and in-dialog explanations. Additionally, the conversational agent needs to be precise in order to yield predictable and well specified results; which can be achieved by guiding the dialog to achieve goals and sub-goals corresponding to the meta-structure, or grammar, of the information model itself.

The accuracy of information models is critical for complex system to function correctly. Information models are essential because they drive many aspects of software development, including but not limited to, database storage, querying, and event processing management. This invention is useful in fields such as banking, defense, healthcare, and supply chain. Another common use of this invention is with chatbots. Chatbots use conversational authoring methods typically with dialog systems to simulate interactions between humans and computer programs. The information model can be a schema for structured nested data, including but not limited to, JSON or XML where these schemas are focused on the types and shapes of data being constructed. Primitive types include strings, integers, Booleans, enumerations, dates, etc. The information model can specify the surrounding structures in which those primitive types are embedded. This surrounding structure is sometimes referred to as composite types. For instance, a particular string might be stored in a column in a table, and the information model specifies the names of that column and that table.

The present invention provides a novel system and method of conversational authoring of information models. Traditionally, information models are authored in a passive manner where the programmer or user provides the initial information when interacting with the information model. In conversational authoring, the programmer or user can be guided by the information model by a series of questions and requests for information to construct the information model. Thus, conversational authoring mimics a more natural conversation between a user and a computer system/server. Additionally, conversational authoring allows for dialogs to be done in a natural language which mimics a normal conversation rather than a programming language. The present invention is described in greater detail by referring to the following discussions and drawings that accompany the present disclosure.

It will be readily understood that components of the present invention, as generally described in the figures herein, can be arranged and designed in a wide variety of different configurations in addition to the presently described preferred embodiments. Thus, the following detailed description of some embodiments of the present invention, as represented in the figures, is not intended to limit the scope of the present invention as claimed, but is merely representative of selected presently preferred embodiments of the present invention. In the description, details of well-known features and techniques can be omitted to avoid unnecessarily obscuring the presented embodiments.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. For the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 1:
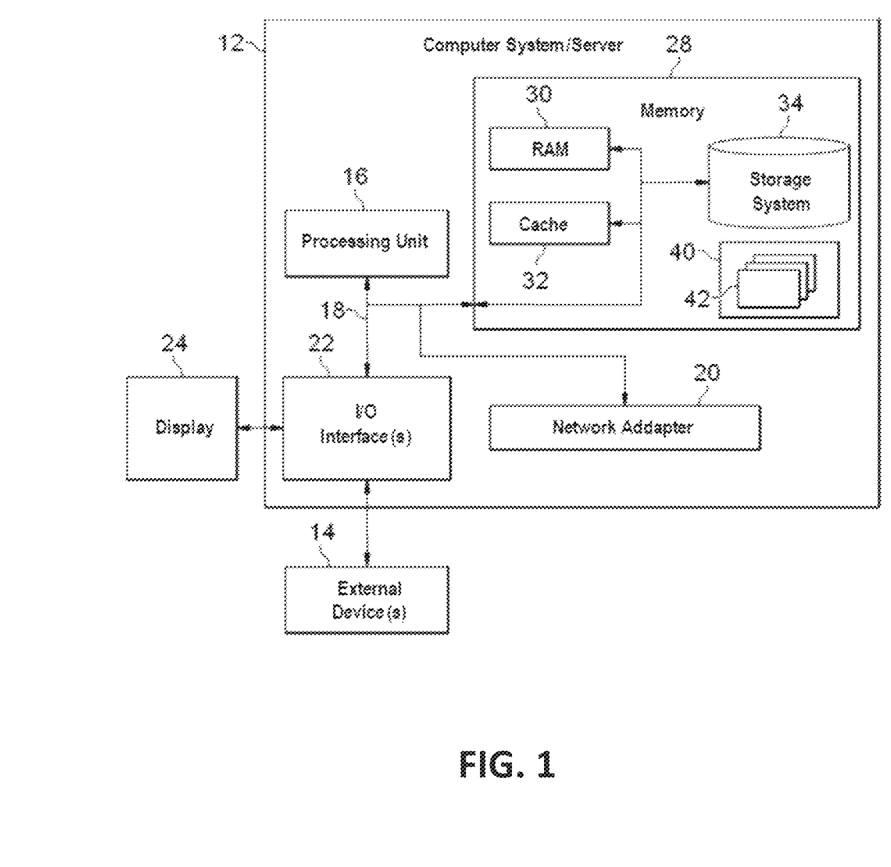
FIG. 1 schematically depicts an exemplary computer system/server which is applicable to implement the embodiments of the present invention.

Referring now to FIG. 1, a schematic of an example of a cloud computing node is shown. Cloud computing node 10 is an example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and allocated cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, computer system/server 12 in cloud computing node 10 is shown in the form of a general-purpose computing device. The components of computer system/server 12 can include, but are not limited to, at least one processor or processing units 16, a system memory 28, and a bus 18 that couples various system components including system memory 28 to processor 16.

Bus 18 represents at least one of any several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, at least one application program, other program modules, and program data. Each of the operating system, at least one application program, other program modules, and program data or some combination thereof, can include an implementation of a networking environment. Program modules 42 generally carry out the functions and/or methodologies of embodiments of the invention as described herein.

Computer system/server 12 can also communicate with at least one external device 14 such as a keyboard, a pointing device, a display 24, etc.; at least one device that enables a user to interact with computer system/server 12; and/or any devices (e.g., network card, modem, etc.) that enable computer system/server 12 to communicate with at least one other computing device. Such communication can occur via Input/Output (I/O) interfaces 22. Computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

Figure 2:
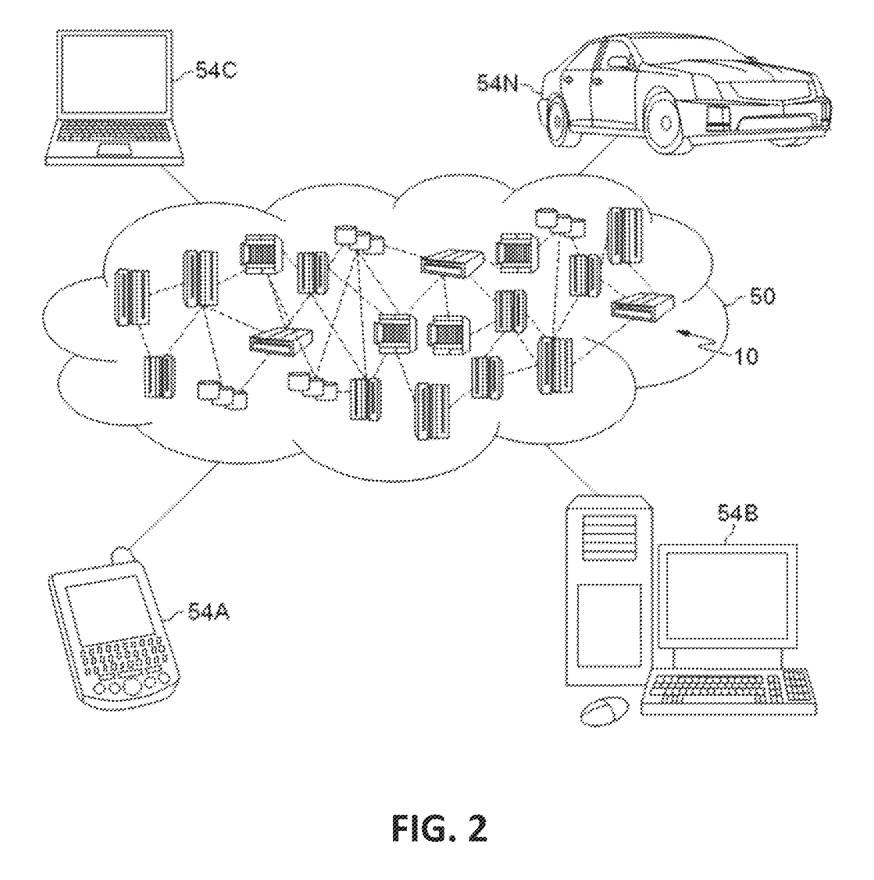
FIG. 2 schematically depicts an exemplary cloud computing environment.

Referring now to FIG. 2, an illustrative cloud computing environment 50 is depicted. As shown, the cloud computing environment 50 includes one or more cloud computing nodes 10 with which local computing devices used by cloud consumers can communicate. The local computing devices can be, for example, personal digital assistant (PDA) or cellular telephone 54A, desktop computer 54B, laptop computer 54C, and/or automobile computer system 54N. The cloud computing nodes 10 can communicate with one another. The cloud computing nodes 10 can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
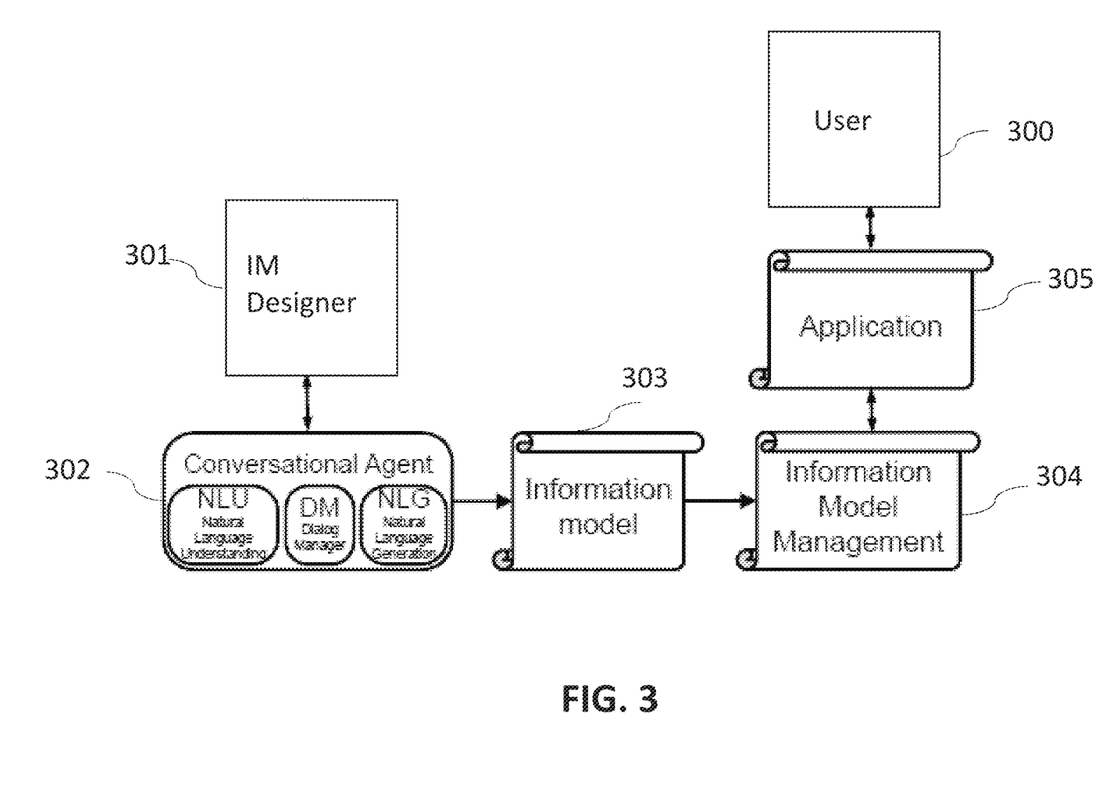
FIG. 3 depicts a block diagram of an architectural embodiment of an information model, information model designer, a conversational agent, an information model management system, and an application.

Referring now to FIG. 3, which depicts a block diagram of an architectural embodiment of a user 300, an information model designer 301, a conversational agent 302, an information model 303, an information model management system 304, and an application 305. First, a conversational agent 302 interacts with an information model designer (IM) designer 301 in natural language. Next, an information model management system 304 interprets and validates the information model 303. Then, an end-user application 305 which depends on the information model 303, is interpreted by the information model management system 304. The information model 303 includes concepts for information and relationships between the concepts. The Program/utility 40, having a set (at least one) of program modules 42 is represented by the application 305.

The conversational agent 302 can interact with an information model (IM) designer 301 in natural language via an external device 14 such as a keyboard and a display 12 or via a microphone and an audio speaker. A keyboard would be best used for browser-based web applications, messaging applications, smart-phone applications, or any other applications that can run on a computer system/server 12. When a keyboard is used, the natural language input and output are strings. A microphone could be part of a telephone, a robot, a car, or a smart room. When a microphone is used, the audio input from the user would first pass through an automated-speech-recognition unit, which turns it into text from a chatbot. Then, the text output from the chatbot would first pass through a text-to-speech unit, which turns it into audio from the user.

There are a variety of validation steps that the information model management system 304 can perform. The information model management system 304 can check if a table has unique names, or if columns within a table have unique names. The information model management system 304 can check that each table has a primary validation key. The information model management system 304 can also check that when one table refers to another table with a foreign validation key, if that foreign validation kay is a primary validation key of a second table. Additionally, the information model management system 304 can check for advanced constraints such as whether the information model 303 is in a normal form.

The conversational agent 302 can include a natural language understanding module, natural language generator module, and a dialog manager. The natural language understanding module analyzes natural languages from the user 300. More specifically, given an utterance such as "Let's start with Products and Locations", the natural language understanding module returns a symbolic representation of the information supplied by the user 300 which the system then uses to work towards its goal of constructing an information model 303. A natural language understanding module can extract both intents such as the actions the user wants to perform and entities such as the objects of those actions. The information model designer 301 can include a human user or be a computer system/server 12. The conversational agent 302 uses a natural language understanding module to turn natural language text into a symbolic form, which then drives the dialog manager. The natural language understanding module can understand intents such as what the user 300 wants to accomplish and entities such as the object with or on which the user 300 wants to accomplish. For example, intents can be recognized via a machine-learning classifier and entities can be recognized via rule-based pattern-machining.

The natural language generator module generates system responses in a natural language. The natural language generator module turns symbolic replies from the system into natural language prompts from the user. The natural language generator plays the opposite role of the natural language understanding module. For example, when the system pursues the goal of filling in the attributes of the Products table, the natural language generator module can generate the prompt "Okay, let's take Products first. What are its attributes?".

A dialog manager directs the conversation and maintains its state based on a dialog specification. A dialog specification indicates how the dialog manager should go about its task. This invention includes a dialog specification for dialogues for authoring information models. There are different types of dialog specification formats. For instance, two popular formats include a finite-state dialog specification or a frame-based dialog specification. A dialog-based information model authoring tool uses existing non-dialog approaches for processing information models 303. Dialog-based approaches are used for a computer system/server 12 to converse with a user 300 in a coherent structure. Dialog-based approaches employ text, speech, graphics, haptic feedback, gestures, and other modes for communication. A non-dialog approach can include a sequence of questions and answers by a computer system/server 12 with a user 300 that is not coherent and can require the user 300 to know how to specifically answer for the computer system/server 12 to understand the response. An example of the authoring tools used can include Unified modeling language (UML) editors, business object model (BOM) editors, or schema support of a relational database.

In FIG. 3, the conversational agent 302 follows the directive from the information model designer 301 and builds an internal representation for the target information model 303. The conversational agent 302 can request information to ask questions of clarification or guide the information model designer 301. The interactions with the conversational agent 302 are considered when designing the information model 303. As a first example, in designing a relational database schema, the conversational agent 302 can ask about the tables and column names, about atomic types for columns, whether the column fields are nullable or not, whether to creates an index, etc. As a second example, in designing an entity-relationship model, the conversational agent 302 can ask questions about entity names and properties, relationships between entities, whether the relationship is one-to-many or many-to-many, etc. As a third example, in designing an object-oriented model, the conversational agent 302 can ask about class and field names, methods and their signatures, what is the super-class, etc.

The conversational agent 302 can export the information model 303 using a representation that can be understood by the information model management system 304. This makes it possible to validate the information model 303 to ensure completeness and consistency. Once created, an application 305 can then use the information model 303 as it would if it had been designed directly from the information model management system 304. The application can run on a computer system/server 12 that can interpret the information model. The way the information model 303 is exported or communicated to the information model management system 304 can differ depending on the kind of information model 303. For instance, a relational schema can be exported using the standard text format for relational database, or can be communicated through an open database connectivity (ODBC) API. For instance, a UML diagram can be exported using a serialized format.

Figure 4:
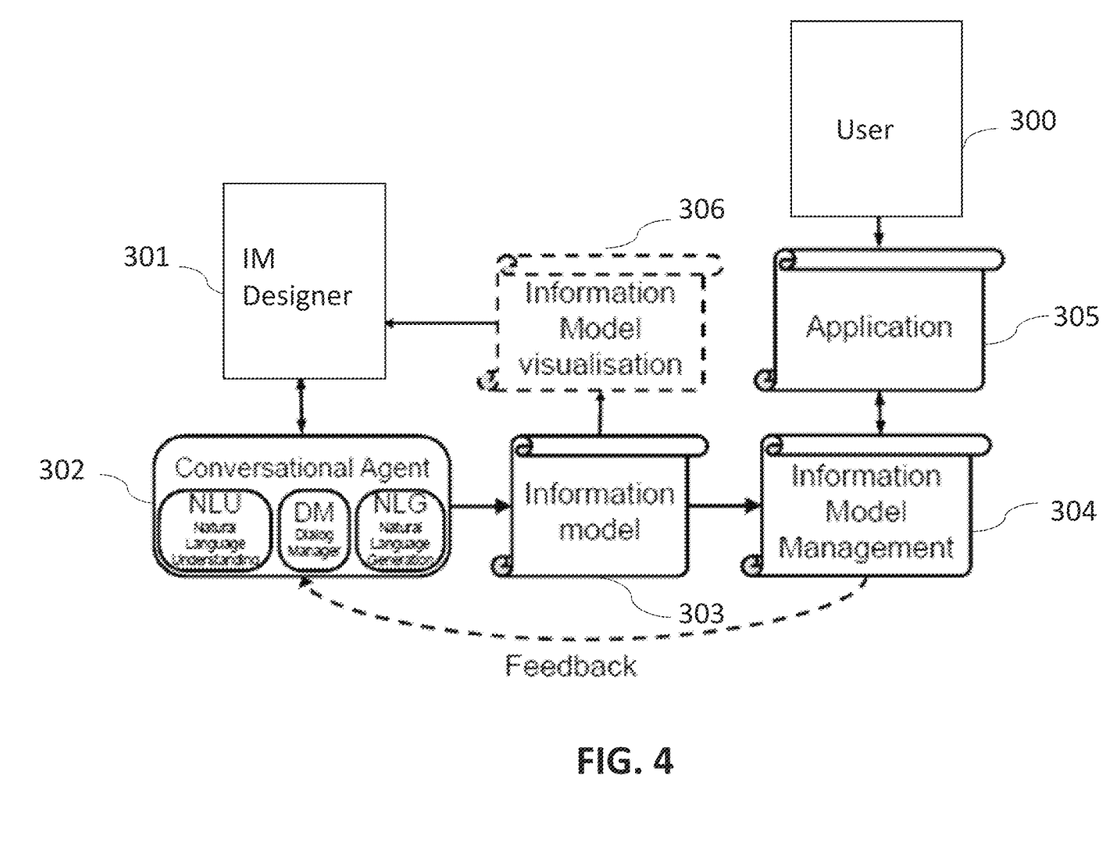
FIG. 4 depicts a block diagram of the architectural embodiment of FIG. 3 where there is a feedback module from the information model management system to the conversational agent and feedback from the information model by an information model visualization system.

Referring now to FIG. 4, which depicts a block diagram of the architectural embodiment of FIG. 3 where there is a feedback module from the information model management system 304 to the conversational agent 302 and a feedback module from the information model 303 by an information model visualization system 306. In another embodiment of the invention, depending on the capabilities of the information model management system 304, partially specified information models can be exchanged with the information model management system 304. Partially specified information models are information models that are being created through the information model management system 304 and lack certain information that will be completed later. This is beneficial as the user 300 may not have all the information needed to complete an information model at a certain time and a partially specified information model would not need to have all the information to be functional. This step is useful in order to provide validation while the conversation with the information model designer 301 occurs.

In FIG. 4, the conversational agent 302 interface can be extended with the ability to display 24 the information model 303 as it is being built. The ability to display the information model 303 through the information model visualization 306 can provide the information model designer 301 with more direct feedback which allows the information model designer 301 to correct errors or identify missing parts of the information model 303 more easily. The information model visualization 306 can vary depending on the kind of information model 303 used. For instance, when designing a relational format, the information model 303 can be displayed in text form to the information model designer 301. As another example, when designing an entity-relationship model, the information model 303 can be displayed using a diagram with boxes for entities and arrows for relationships.

Figure 5:
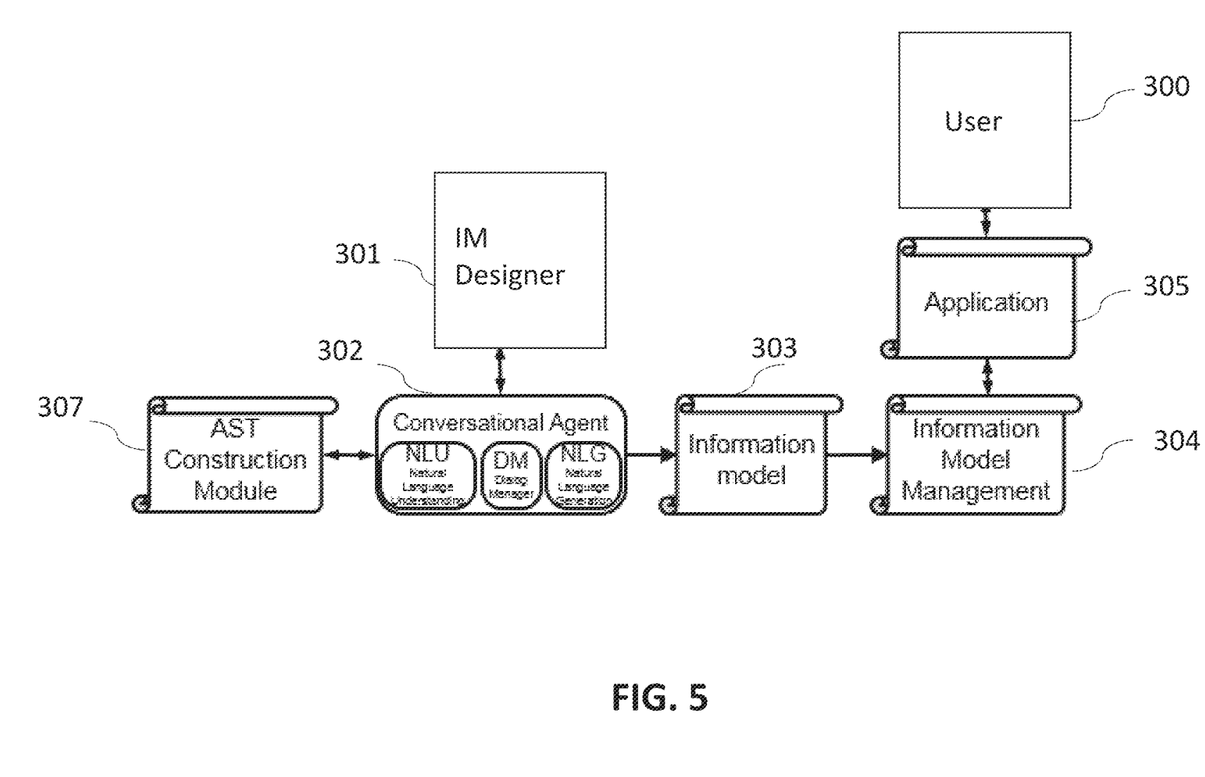
FIG. 5 depicts a block diagram of the architectural embodiment of FIG. 4 where a grammar support module for relational schema is added.

Referring now to FIG. 5, which depicts a block diagram of the architectural embodiment of FIG. 4 where a grammar support module 307 for relational schema is added. In another embodiment, the conversational agent 302 constructs the information model 303 with the help of a grammar support module 307 to construct an abstract syntax tree (AST). The abstract syntax tree is built using the grammar support model 307 which includes grammar corresponding to the meta-model for the specific information model 303 needed. For instance, the following is an example of the grammar for the meta-model corresponding to part of a relational schema:

```
schema    : table* &{validSchema(schema)};
table     : attribute* key;
attribute "field" / "property" : name type key?;
name      : string;
type      : "string" / "words"
          | "integer" / "number"
          | "date";
```

For the above example, the grammar support module uses terminology suitable for relational schemas (schema, table, fields, type). The grammar support module 307 takes the grammar into account to ensure the information model 303 being created is consistent with the structure expected for a relational schema.

Sample data can help narrow the choices presented to the user 300 by only presenting choices consistent with the user data. Additionally, an information model 303 can be inferred from the data through a variety of techniques such as machine language learning techniques and presented to the user 300 as choices as part of the dialog.

The sample data can also be checked for conformance with the schema as the user 300 builds the information model 303 through dialog, which would enable early feedback to the user 300 of non-compliance. The feedback module would indicate that the user 300 is constructing an information model that does not reflect the information model 303 that is currently in use.

Figure 6:
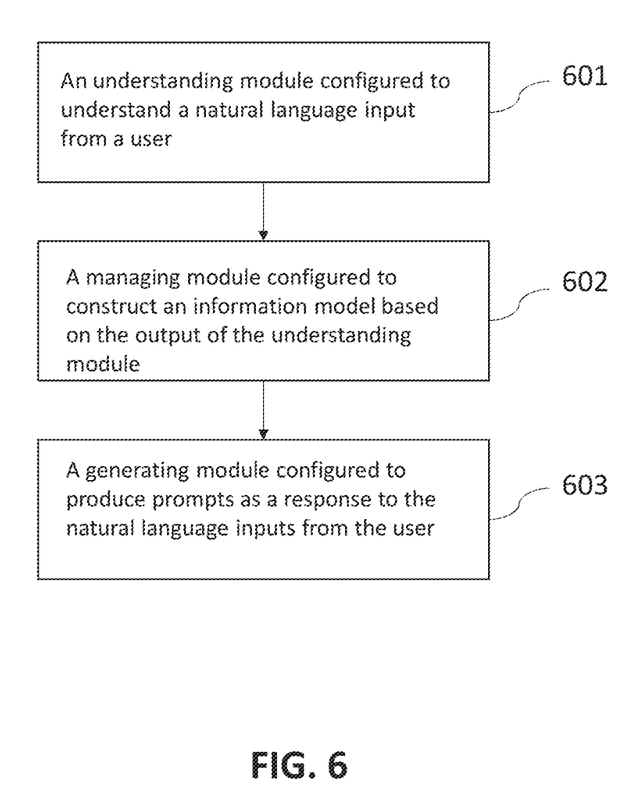
FIG. 6 depicts a flow chart of a method for conversational authoring of information models.

Referring now to FIG. 6, which depicts a flow chart of a method for conversational authoring of information models. The method includes three blocks. In block 601, an understanding module is configured to understand a natural language input from a user 300. In block 602, a managing module is configured to construct an information model 303 based on the output of the understanding module. In block 603, a generating module is configured to produce prompts as a response to the natural language inputs from the user 300, wherein the natural language inputs determine concepts and relationships of the concepts.

The information model 303 receives the type and shape of data that is used, stored, and passed by the user 300 through an application 305. Primitive types of data include strings, integers, Booleans, enumerations, dates, etc. The information model can specify the surrounding structures in which those primitive types are embedded. This surrounding structure is sometimes referred to as composite types. For instance, a particular string might be stored in a column in a table, and the information model specifies the names of that column and that table. In block 601, the dialog can use multiple back and forth turns with the user 300 to solicit the information needed in block 602 when constructing the information model 303.

The information model 303 can employ integrity constraints such as "contains", "is", and "refers to" relationships. In general, the information model 303 can contain arbitrary predicates that need to be satisfied by the data being constructed in block 602.

The information model 303 can also specify operations that can be performed such as methods of classes using an object oriented language and stored procedures in database.

In block 603, outputs of the dialog or understanding module can be echoed back in two different ways. The first way is by outputting sample data that is valid according to the schema that has been so-far specified. The second way is by outputting a representation of the schema. The approach is particularly relevant when the information model 303 has an already understood format or visualization. For example, for a JSON schema, a well-formatted fragment of the JSON schema that encodes the requested information model 303 can be echoed to the user 300. For a dialog that is building something like a UML model, a graphical representation would be more appropriate.

Figure 7:
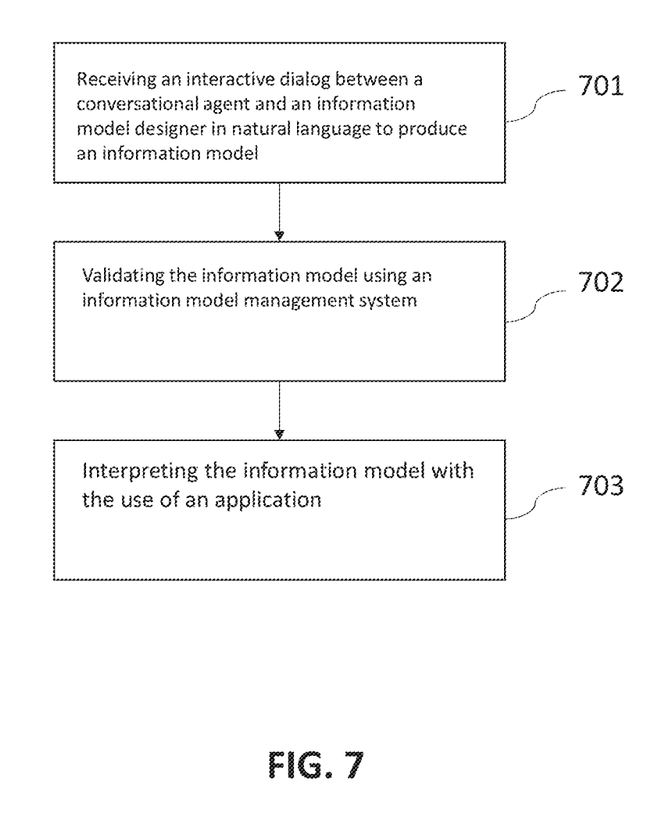
FIG. 7 depicts a flow chart of an alternative method for conversational authoring of information models.

Referring now to FIG. 7, which depicts a flow chart of an alternative method for conversational authoring of information models. The method includes three block diagrams. In block 701, a conversational agent 302 and an information model designer 301 interact in natural language to produce an information model 303. In block 702, an information model management system 304 is interpreted to validate the information model 303. In block 703, the information model 302 is interpreted with the use of an application 305, wherein the information model includes concepts for information and relationships between the concepts.

A dialog can support model lifecycle management which includes deployment, converting to another information model, updating an existing information model, and merging two information models 303. The resulting information model 303 of the dialog does not have to be a static artifact. The dialog can allow the resulting information model 303 to be deployed to a running computer system/server 12 for execution or as documentation. It can also enable sophisticated lifecycle actions which include obtaining, editing, updating, and merging information models 303.

The conversational agent 302 can display the information model 303 as it is populated with information to allow for feedback and corrections. If the dialog is building a UML model, it can integrate with existing UML editors to build up the specified diagram as the dialog progresses. It can also enable a rich interplay between actions in the environment and the dialog. For example, as the dialog progresses, it can build the requested UML diagram in the authoring environment. The user 300 can make a change to the diagram in that environment. The dialog system can note this change and integrate it into the dialog or learn from it.

Figure 8:
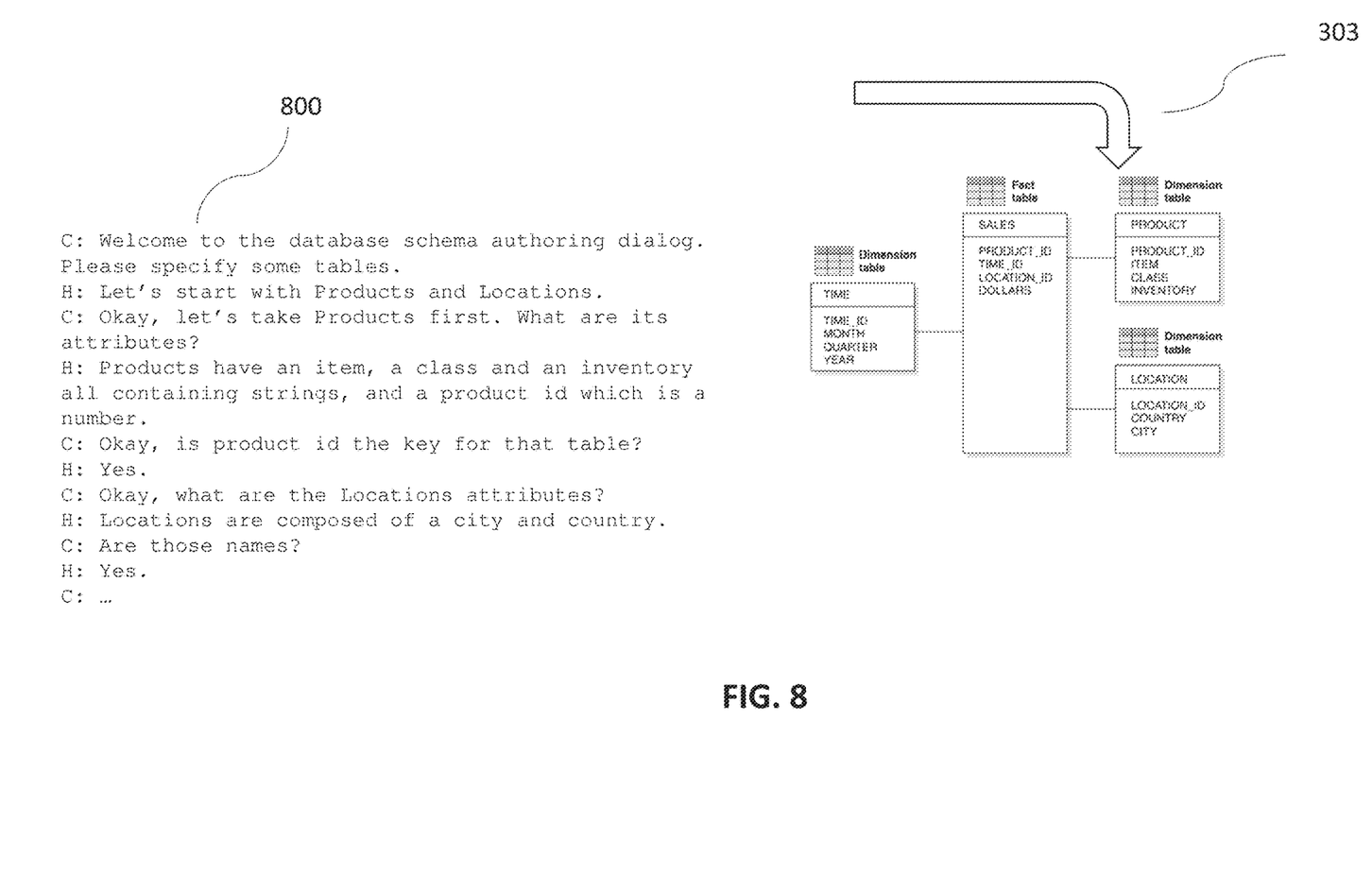
FIG. 8 depicts a diagram of an example conversational authoring of information models using an interactive dialog system.

Referring now to FIG. 8, which depicts a diagram of an example conversational authoring of information models using an interactive dialog system. In this example, the user 300 will specify information such as vocabulary, structure, and relationships of the information model 303 using an interactive dialog system 800. The interactive dialog system 800 elicits the information through a natural language conversation. In the example, the interactive dialog system 800 displays the dialog between the user 300 (marked as "H") and the computer/system server 12:

C: Welcome to the database schema authoring dialog. Please specify some tables.
H: Let's start with Products and Locations.
C: Okay, let's take Products first. What are its attributes?
H: Products have an item, a class and an inventory all containing strings, and a product id which is a number.
C: Okay, is product id the key for that table?
H: Yes.
C: Okay, what are the Locations attributes?
H: Locations are composed of a city and country.
C: Are those names?
H: Yes.
C: . . .

In the above example, the names of tables (such as "Products", "Locations") and their attributes (such as "item", "class", "inventory" . . . ) constitute the vocabulary of the information model 303. The attributes of a table (e.g., the "item" string attribute of the "Products" table) constitute the structure of the information model 303. The keys of a table (e.g., "PRODUCT_ID") are used for specifying the relationships of the information model 303. As the dialog above continue, it produces the information model 303.

In the interactive dialog system 800, the computer/system server 12 ("C") asks "Okay, is product id the key for that table?". This is the conversational agent 302 automatically making a suggestion for which column to designate as a primary key. This suggestion can be based on simple heuristics programmed explicitly into the conversational agent, for instance, based on the fact that this is the only column of type Integer. Alternatively, if the invention has access to several other information models 303 designed in the past, it could analyze those to realize that a column name ending in "ID" commonly serves as a primary key, and make its recommendation based on that fact.

In FIG. 8, the advantage of this dialog approach as compared to prior non-dialog approaches to authoring information models is that this dialog approach remains natural. Domain experts without deep technical knowledge can easily understand the conversation above. The interactive dialog system 800 verifies and enforces the information model 303 and constraints as the information model 303 is being constructed. Additionally, this approach allows for a goal-driven conversation because it allows the information model 303 to have all the different types of aspects specified. Also, the computer system/server 12 drives the dialog towards the goal-driven conversation by prompting the user 300 to supply the required vocabulary, structure, and relationships.

In FIG. 8, the information model 303 can show a database schema. Such a schema consists of a number of tables, for example, one table each for TIME, SALES, PRODUCT, and LOCATION. For each table, the information model 303 specifies a number of columns. For example, the PRODUCT table might have four columns, one each for PRODUCT_ID, ITEM, CLASS, and INVENTORY. For each column, the information model 303 specifies a type. For example, PRODUCT. ITEM can be of type String, whereas PRODUCT.PRODUCT_ID may be of type Integer. In addition, the information model 303 specifies keys. For example, PRODUCT_ID may be the primary key of the PRODUCT table as well as a foreign key of the SALES table.

In FIG. 8, the relational schema where the SALES table contains a foreign key PRODUCT_ID that refers to the PRODUCT table. If the PRODUCT table does not have a primary key for PRODUCT_ID, this would be invalid, and would need to be raised to the information model designer 301. The conversational agent 302 can raise this problem using natural language suitable for non-experts. Furthermore, it can offer suggestions for how the information model designer 301 could fix the information model 303, for instance, by adding the missing column to the PRODUCT table.

Figure 9:
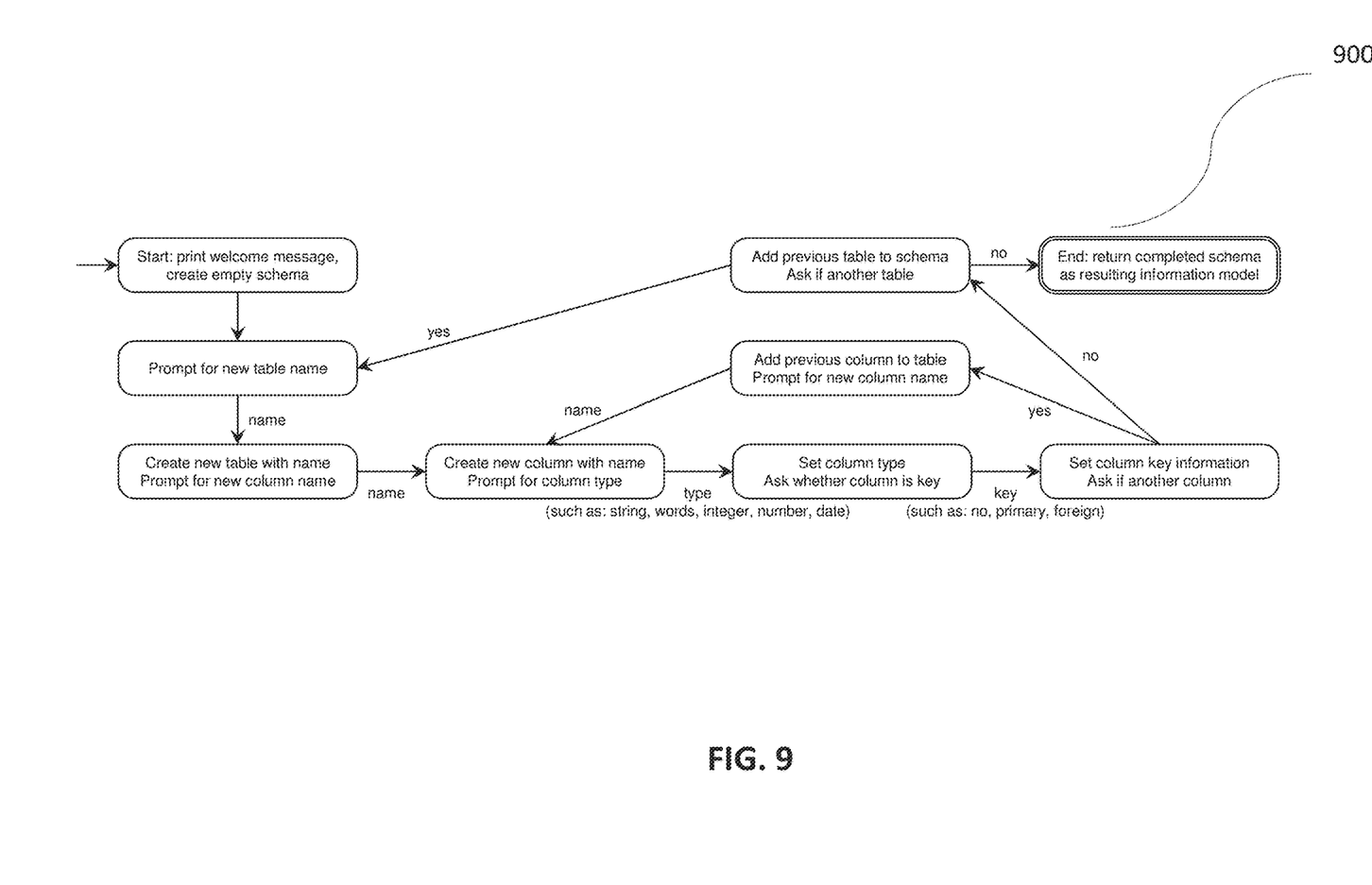
FIG. 9 depicts a diagram of an example conversational authoring of a finite state machine.

Another way to specify the dialogue for the current invention could be driven by a finite state machine as shown in FIG. 9. In FIG. 9, each state 900 is drawn as a rectangle with rounded corners and contains actions such as updating the information model 303 and/or prompting the user 300. Each transition is drawn as an arrow and is triggered by a condition, typically based on input received from the user and converted into symbolic form by the natural-language module in the conversational agent 302. As with the grammar shown above, this finite state machine also drives a dialogue for authoring a relational schema, using terminology such as table and column.

In 900, the first state is a "start screen", where an empty schema is created for the user 300. The next state is to prompt the user 300 for a new table name. Once the user 300 inputs the table name, the next state creates a table with the name and prompts the user 300 for a new column name. Once the user 300 inputs the column name, the next state creates a column with the name and prompts the user 300 for a column type. The column type can include a string, words, integer, numbers, date, etc. The next state prompts the user 300 if the column is a key. The user 300 can input no, primary validation key, foreign validation key, etc. The next state sets the column key information if applicable. The following state will then either branch off into prompting for a new column to add to the table or ask if another table should be created. If a new column should be added to the table, the state machine will jump to the state to create a new column with name. If another table should be added, the state machine will jump to the state to prompt the user 300 to enter a new table name. If the user 300 does not need another table, the state machine jumps to the last state to return the completed schema resulting in an information model 303. Those skilled in the art can easily craft a more elaborate version of the finite state machine that enables a more flexible authoring dialogue by supporting alternative paths and transitions, for instance, where a single utterance provides multiple pieces of information.

The present invention can be a circuit, a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A system comprising:
   an understanding module configured to understand a natural language input to interpret an output;

a managing module configured to construct an information model based on the output of the understanding module, wherein the information model is an object-oriented class hierarchy where a shape and a relationship for different types of information are declared; and a generating module configured to generate a prompt, as a response to the natural language inputs, wherein the natural language inputs determine concepts and relationships of the concepts.

2. The system of claim 1, further comprising running an application program on a computer system/server that can interpret the information model.

3. The system of claim 1, wherein the information model is created using an authoring tool for a non-dialog approach.

4. The system of claim 3, wherein the authoring tool has schema support of a relational database.

5. The system of claim 3, wherein the authoring tool has unified model language (UML) editors.

6. The system of claim 1, wherein the information model is a schema for structured nested data where the schema is focused on shapes and types of data being constructed.

7. A system comprising:

a conversational agent that interacts with an information model designer in natural language inputs to produce an information model, wherein the information model is an object-oriented class hierarchy where a shape and a relationship for different types of information are declared;

an information model management system that interprets and validates the information model; and an application that interprets the information model, wherein the information model includes concepts for information and relationships between the concepts.

8. The system in claim 7, wherein the conversational agent follows the directive of the information model designer and builds an internal representation for a target information model.

9. The system in claim 7, wherein the conversational agent requests information from the information model for asking a question and clarifying a question.

10. The system in claim 7, wherein the conversational agent exports the information model using a representation that can be understood by the information model management system.

11. The system in claim 7, wherein the information model management system can receive a partially specified information model to provide validation while a conversation with the information model occurs to create a target information model.

12. The system in claim 7, wherein the conversational agent displays the information model as it is populated with information to allow for feedback and corrections.

13. The system in claim 7, wherein the conversational agent constructs the information model with the help of a grammar support module to construct an abstract syntax tree (AST).

14. The system in claim 7, wherein the conversational agent includes a natural language understanding module.

15. The system in claim 7, wherein the conversational agent includes a natural language generator module.

16. The system in claim 7, wherein the conversational agent includes a dialog manager.

17. The system in claim 7, further comprising a feedback module to integrate with an authoring environment to build a specified diagram for a dialog progress.

18. The system in claim 7, wherein dialog progress supports the information model lifecycle management to allow the resulting information model to be deployed to a running system.

19. A method comprising:

receiving an interactive dialog between a conversational agent and an information model designer in natural language to produce an information model, wherein the information model is an object-oriented class hierarchy where a shape and a relationship for different types of information are declared;

validating the information model using an information model management system; and interpreting the information model with the use of an application, wherein the information model includes concepts for information and relationships between the concepts.

* * * * *